(12) United States Patent
Murphy

(10) Patent No.: US 6,195,084 B1
(45) Date of Patent: *Feb. 27, 2001

(54) MOUSE BUTTONS DESIGNED FOR IMPROVED AVAILABILITY

(75) Inventor: Stephen C. Murphy, Payette, ID (US)

(73) Assignee: Micron Electronics, Inc., Nampa, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,524

(22) Filed: Oct. 14, 1997

(51) Int. Cl.[7] ........................................................ G09G 5/08
(52) U.S. Cl. ........................... 345/163; 345/156; 345/157; 345/161; 345/167
(58) Field of Search ..................................... 345/163, 156, 345/157, 161, 167, 173

(56) References Cited

U.S. PATENT DOCUMENTS

| 4,964,075 | * | 10/1990 | Shaver et al. .......................... 710/67 |
| 5,305,449 | * | 4/1994 | Ulenas .................................... 710/73 |
| 5,611,040 | * | 3/1997 | Brewer et al. ........................ 395/326 |
| 5,793,972 | * | 8/1998 | Shane ............................... 395/200.49 |
| 5,870,080 | * | 2/1999 | Burnet et al. ........................ 345/163 |
| 5,898,424 | * | 4/1999 | Flannery ............................... 345/163 |

* cited by examiner

*Primary Examiner*—William A. Cuchlinski, Jr.
*Assistant Examiner*—Marthe Y. Marc-Coleman
(74) *Attorney, Agent, or Firm*—Park & Vaughan LLP

(57) ABSTRACT

The resist to be used for the method of this invention in producing a semiconductor device is patterned by a procedure which comprises the steps of disposing in the direction of a semiconductor wafer a first mask having circuit patterns repeatedly formed at a plurality of positions, then shielding those of said plurality of circuit patterns which overlap the edge of the semiconductor wafer with a blind to an extent such that the remaining circuit patterns are not shielded, exposing a resist overlying the semiconductor wafer by using the first mask held in a state partially shielded by the blind, projecting light through a second mask provided with a light passing pattern defined by a shielding film to an area of the resist to which the edge of the blind is transferred, and developing the resist.

13 Claims, 4 Drawing Sheets

MOUSE BUTTONS DESIGNED FOR IMPROVED AVAILABILITY

BACKGROUND OF THE INVENTION

1. Field of the Invention

This invention relates to a method for the production of semiconductor devices.

2. Description of the Prior Art

The process of producing a semiconductor integrated circuit includes the operation of forming a film on a semiconductor wafer and patterning the film by photolithography at several steps.

For the purpose of forming a plurality of identical semiconductor integrated circuits on one semiconductor wafer, the photolithography adopts the method of step and repeat reduction-type projection printing. The projection printing method utilizes a reticule having a plurality of identical circuit patterns arrayed adjacently thereon, to effect simultaneous exposure of a resist to the plurality of circuit patterns.

The semiconductor wafer, after having these semiconductor integrated circuits formed thereon, is divided into individual chips, each bearing one of the semiconductor integrated circuits.

However, as illustrated in FIG. 1A, since a semiconductor wafer 101 has a circular shape and, one unit circuit pattern forming area on a reticule 102 has a rectangular shape, a certain proportion of the circuit patterns 103a to 103d on the reticule 102 used during the exposure inevitably protrude from the semiconductor wafer 101 during the exposure (the hatched area in the diagram). The circuit patterns 103d which are formed near the circumference of the semiconductor wafer 101 and contain a missing portion will be referred to hereinafter as "rejectable circuit patterns" or "rejectable chips."

Also, as the puddle developing method, inwhich a liquid developer is piled on a semiconductor wafer, is generally adopted as the means to develop an exposed resist, the circumferential region of the semiconductor wafer is insufficiently developed. This inevitably gives rise to abnormally shaped resist patterns.

When the abnormally shaped resist patterns such as this exist near the circumference edge of the semiconductor wafer, films which are patterned using this resist pattern as a mask, are also abnormally shaped. Problems can occur, for example during the formation of storage electrodes on DRAM, when a hydrofluoric acid treatment is done to remove the silicon oxide film from beneath a polycrystalline silicon film, which forms the storage electrode. The polycrystalline silicon that is not connected to the substrate in the abnormally patterned area floats off and becomes attached as a particle in the normal pattern area, forming a factor causing reduced yields.

As a way of removing such abnormal patterns, a method of projecting light onto the whole area destined to produce rejectable chips after the exposure may be adopted as disclose in JP 07142309A. This method, however, is not as effective in preventing the occurrence of abnormal patterns as expected because it produces no change in the fact that the development is insufficient in the area of rejectable chips.

To cope with this problem, a method has been adopted of omitting the projection of the circuit patterns 103a to 103d of the reticule 105 of FIG. 1B at the positions where the circuit patterns overlap the circumference edge of the semiconductor wafer 101, i.e. the position which correspond to the hatched area of FIG. 1A.

However if the exposure to light is omitted from the area in which the circumference edge of the semiconductor wafer overlaps at least one of the circuit patterns on the reticule, a wasted area of a width which covers one to three circuit patterns arises near the circumference edge of the semiconductor wafer. This causes a problem of lowered yield.

The practice of forming only one circuit pattern on a reticule and using this reticule for the purpose of exposure to light is also an option. However, this causes a large increase in the number of shots of light involved during the treatment of exposure to light, and inevitably results in a decrease in the throughput.

SUMMARY OF THE INVENTION

The object of this invention is to provide a method for the production of semiconductor devices, which incorporates therein a patterning step which is capable of repressing the occurrence of particles and also improves the throughput and the yield during the treatment of exposure to light.

In this invention, after a plurality of circuit patterns in a reticule (exposure mask) are projected onto a resist on a semiconductor wafer, with the exposure of the circuit patterns which overlap with the edge of the wafer being blocked by a blind, a separate mask is used to selectively expose the parts in the resist to which the edge of the blind was projected, and to remove these parts.

As a result, the exposure of the ineffective circuit patterns which overlap with the edge of the wafer is prevented, the formation of abnormal resist patterns which occurs around the circumference of a semiconductor wafer is avoided, and the occurrence of abnormal resist patterns which occur as a result of the blurred focus where the edge of the blinds are projected is also prevented. It is therefore possible to greatly suppress the occurrence of particles, which arise from these abnormal resist patterns.

Further, since only those of the plurality of circuit patterns formed in the reticule which do not overlap the edge of the semiconductor wafer are exposed to light, the number of available circuit patterns that are formed on the semiconductor wafer does not need to be reduced. As a result, the yield is improved because the number of available chips per semiconductor wafer is increased.

There is no reduction of throughput because the reticule to be used has a plurality of circuit patterns formed therein.

The reticule which is used for erasing the edge of a blind transferred to the resist may be formed in the same reticule that contains the circuit patterns, or may be formed as a separate entity.

When a plurality of circuit patterns are to be arranged repeatedly in a lengthwise and a crosswise direction in one reticule, this reticule is provided with lengthwise oblong or crosswise oblong light passing patterns for erasing the latent image or the edge of the blind in the resist. In this case, the aperture area of the lens can be effectively utilized by locating the light passing pattern in the area surrounding the circuit patterns area and near the center of the circuit patterns area.

Further, the lengthwise oblong light passing pattern is given a greater length than one side of a circuit pattern in the lengthwise direction, and the crosswise oblong light passing pattern given a greater length than another side of the circuit pattern in the crosswise direction. In this arrangement, it is possible to leave no space between the projections of lights on line of the latent image of the edge of the blind, when the part of the resist which was exposed at the edge of the blind is split into several parts for the exposure.

The available exposure area of the lens can be utilized to the utmost by positioning the light passing pattern close to the center of the circuit patterns area. The formulation of the program at the stage of designing the circuit patterns on the reticule is facilitated if the light passing pattern is symmetrical.

It becomes possible to obviate the necessity of changing reticules and avoid a decline in throughput arising from re-alignment, if the circuit patterns and the light passing patterns for the erasure of the latent image of the blind edge are formed on one and the same reticule.

BRIEF DESCRIPTION OF THE DRAWING

FIG. 5A is a plan view illustrating the area on a semiconductor wafer which is exposed to light by the reticule shown in FIG. 4, and FIG. 5B is a cross section view of the semiconductor wafer;

FIG. 6A is a plan view illustrating the first example of the positional relationship between the reticule as shown in FIG. 4, and the blind shown in FIG. 3, and FIG. 6B is a plan view schematically illustrating the latent pattern image resulting from the exposure using a reticule shielded from light by a blind as shown in FIG. 6A;

FIG. 7A is a plan view illustrating the second example of the positional relationship between the reticule and the blind shown in FIG. 4, and FIG. 7B is a plan view schematically illustrating the latent pattern image resulting from exposure using a reticule shielded from light by a blind as shown in FIG. 7A;

FIG. 8A is a plan view illustrating the third example of the positional relationship between the reticule and the blind shown in FIG. 4, and FIG. 8B is a plan view schematically illustrating the latent pattern image resulting from exposure using a reticule shielded from light by a blind as shown in FIG. 8A;

FIG. 9A is a plan view illustrating the fourth example of the positional relationship between the reticule and the blind shown in FIG. 4, and FIG. 9B is a plan view schematically illustrating the latent pattern image resulting from exposure using a reticule shielded from light by a blind as shown in FIG. 9A;

FIG. 10A and FIG. 10B are plan views respectively illustrating the second example and the third example of the reticule to be used in an embodiment of this invention;

FIG. 11 is a plan view illustrating the fourth example of the reticule to be used in an embodiment of this invention;

FIG. 12 is a plan view illustrating the fifth example of the reticule to be used in an embodiment of this invention;

FIG. 13 is a plan view illustrating the sixth example of the reticule to be used in an embodiment of this invention; and FIG. 14 is a plan view illustrating the seventh example of the reticule to be used in an embodiment of this invention.

DESCRIPTION OF THE PREFERRED EMBODIMENTS

Now, the preferred embodiments of this invention will be described below with reference to the accompanying drawings.

Figure 2:
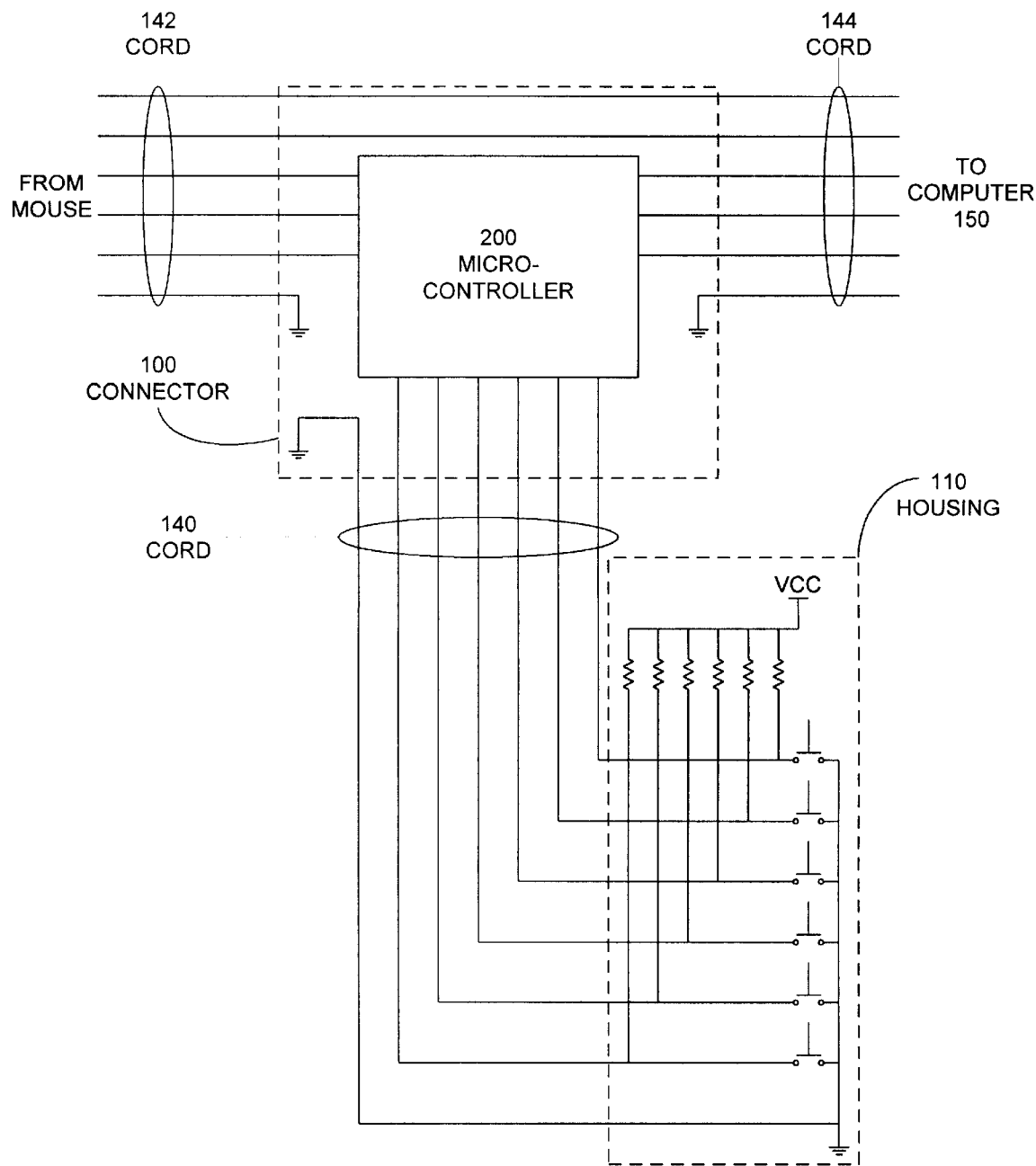
FIG. 2 is a structural diagram of a device for light exposure to be used in an embodiment of this invention.

FIG. 2 illustrates one example of the exposure device to be used for the exposure of a resist in the production of a semiconductor device according to an embodiment of this invention.

In this exposure device, a blind 3, a mirror 4, an upper lens system 5, and a projection reduction part 6 are positioned sequentially in the order mentioned, from a light source 1 toward a wafer stage 2. A reticule (exposure mask) 7, which will be specifically described herein below, is interposed between the upper lens system 5 and the projection reduction part 6. The circuit patterns formed in the circuit pattern areas of the reticule are projected onto the resist R on the semiconductor wafer W.

Figure 3:
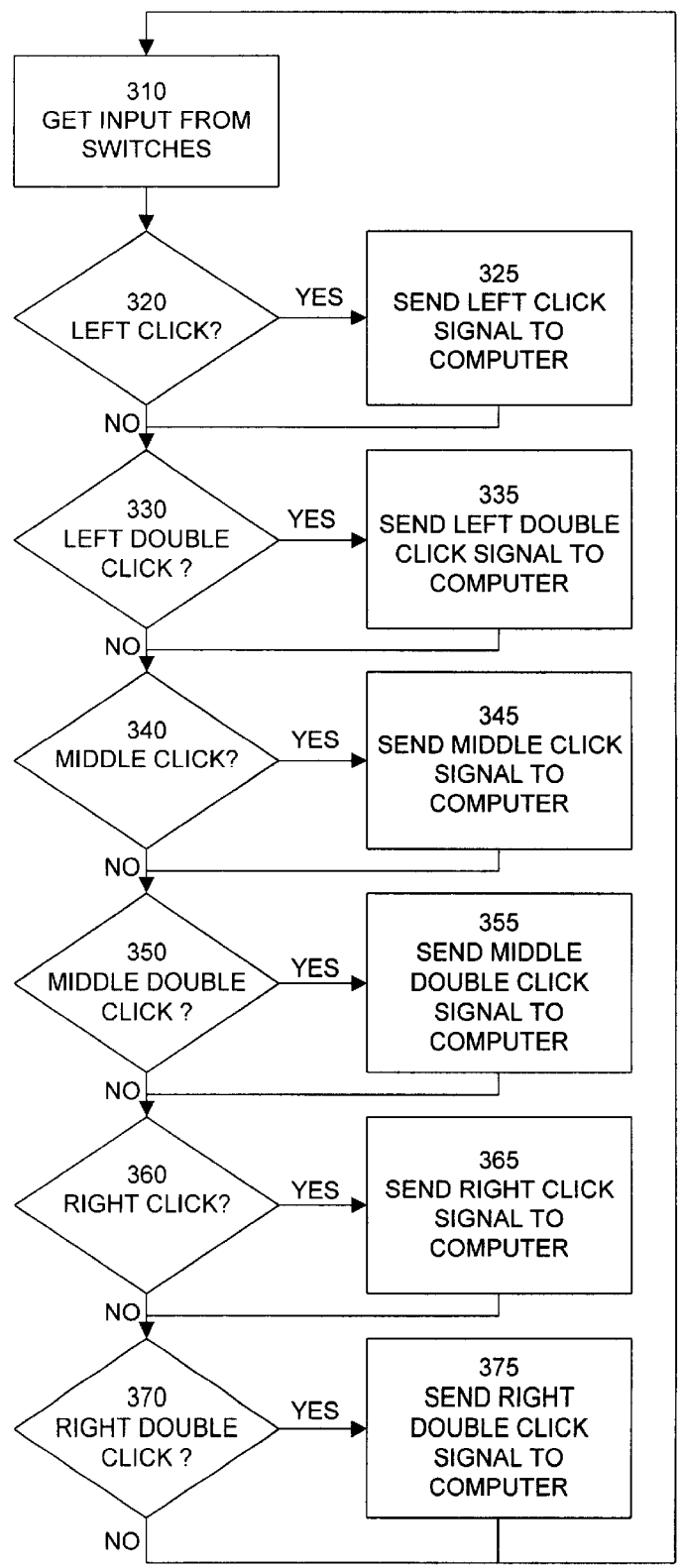
FIG. 3 is a plan view illustrating one example of a blind in the device for light exposure shown in FIG. 2.

The blind 3 is provided with a plurality of shielding plates 3a to 3d for example as illustrated in FIG. 3, and it is possible to form an opening part 3e of a necessary shape, by appropriately combining these shielding plates 3a to 3d. The size and the position of the opening part 3e can be varied by moving these shielding plates 3a to 3d individually in the lengthwise and the crosswise direction.

Figure 4:
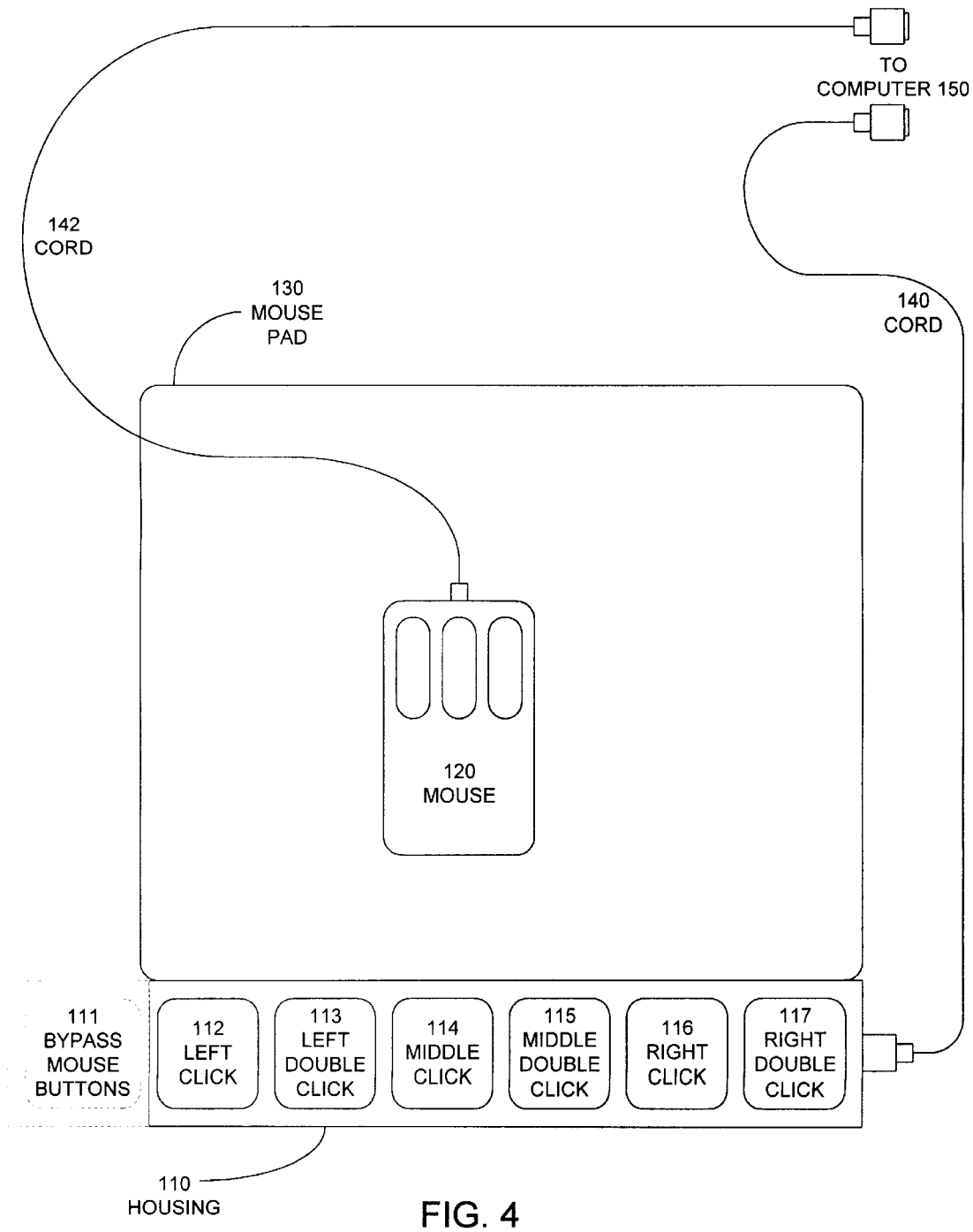
FIG. 4 is a plan view illustrating the first example of a reticule to be used in an embodiment of this invention.
Figure 1:
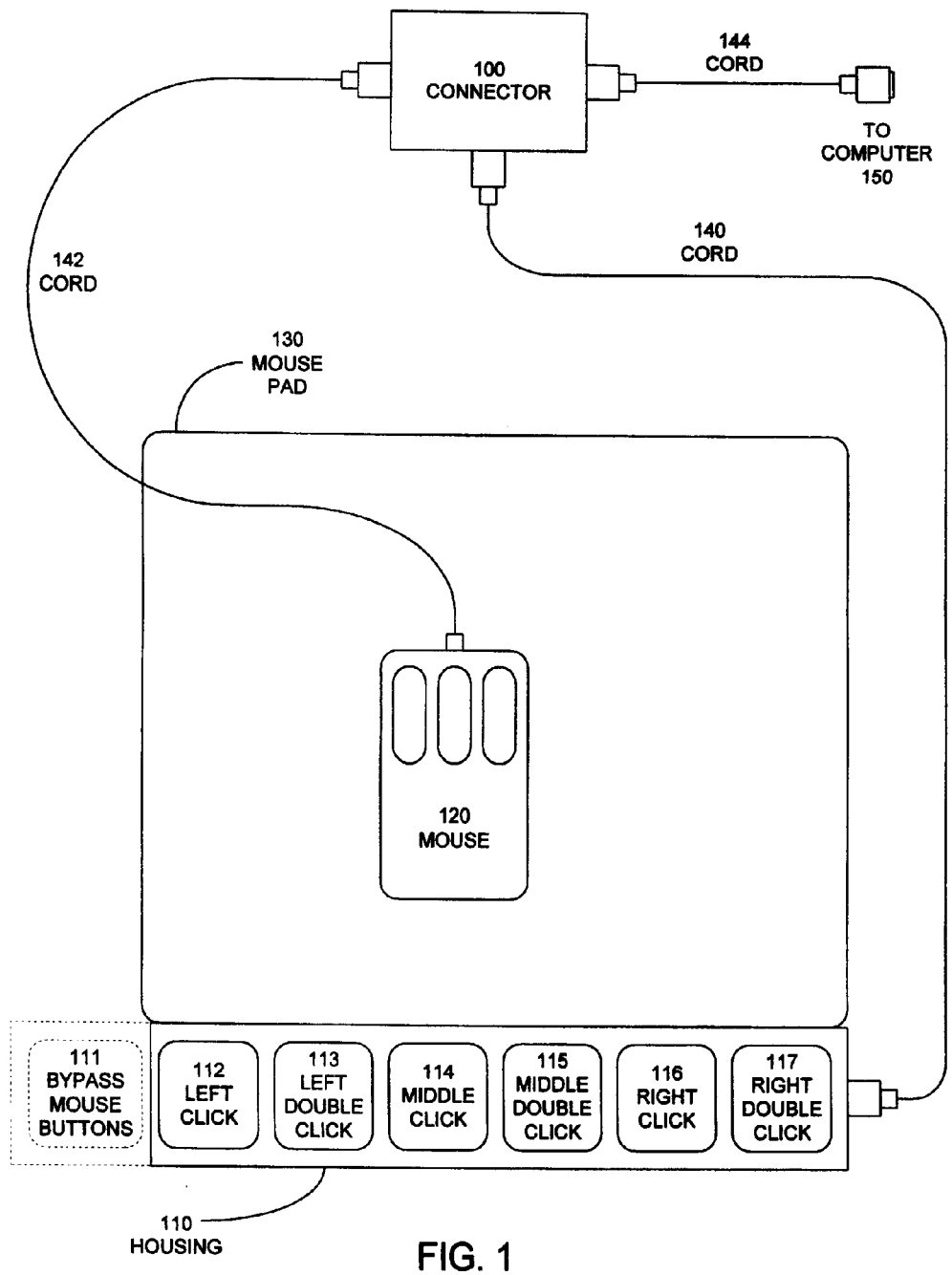
Figure 2:
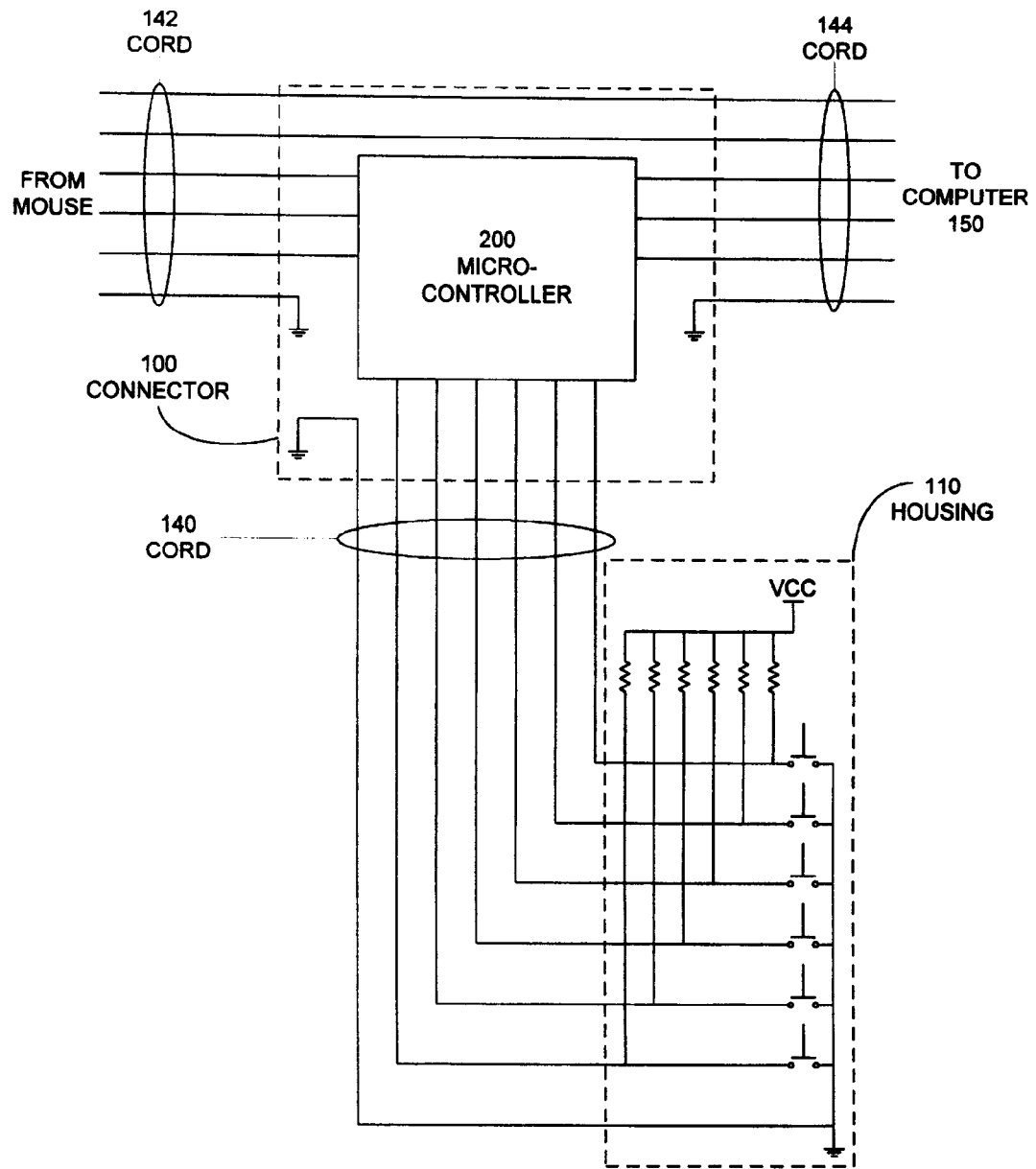
Figure 3:
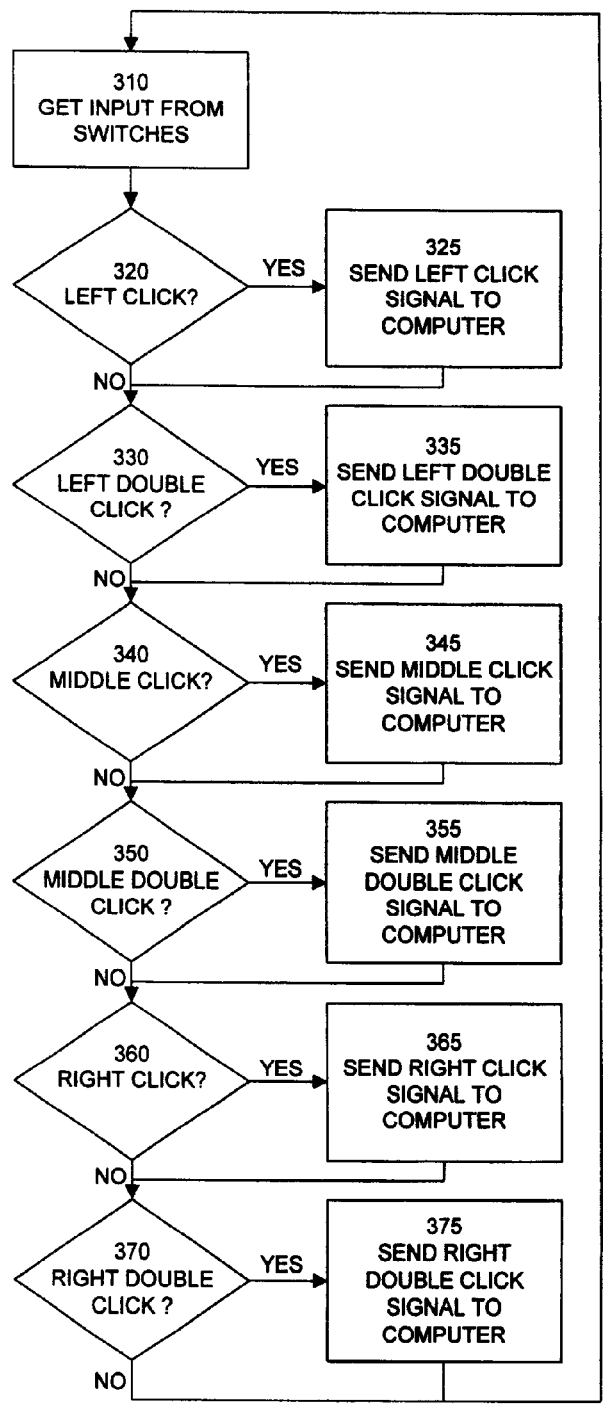
Figure 4:
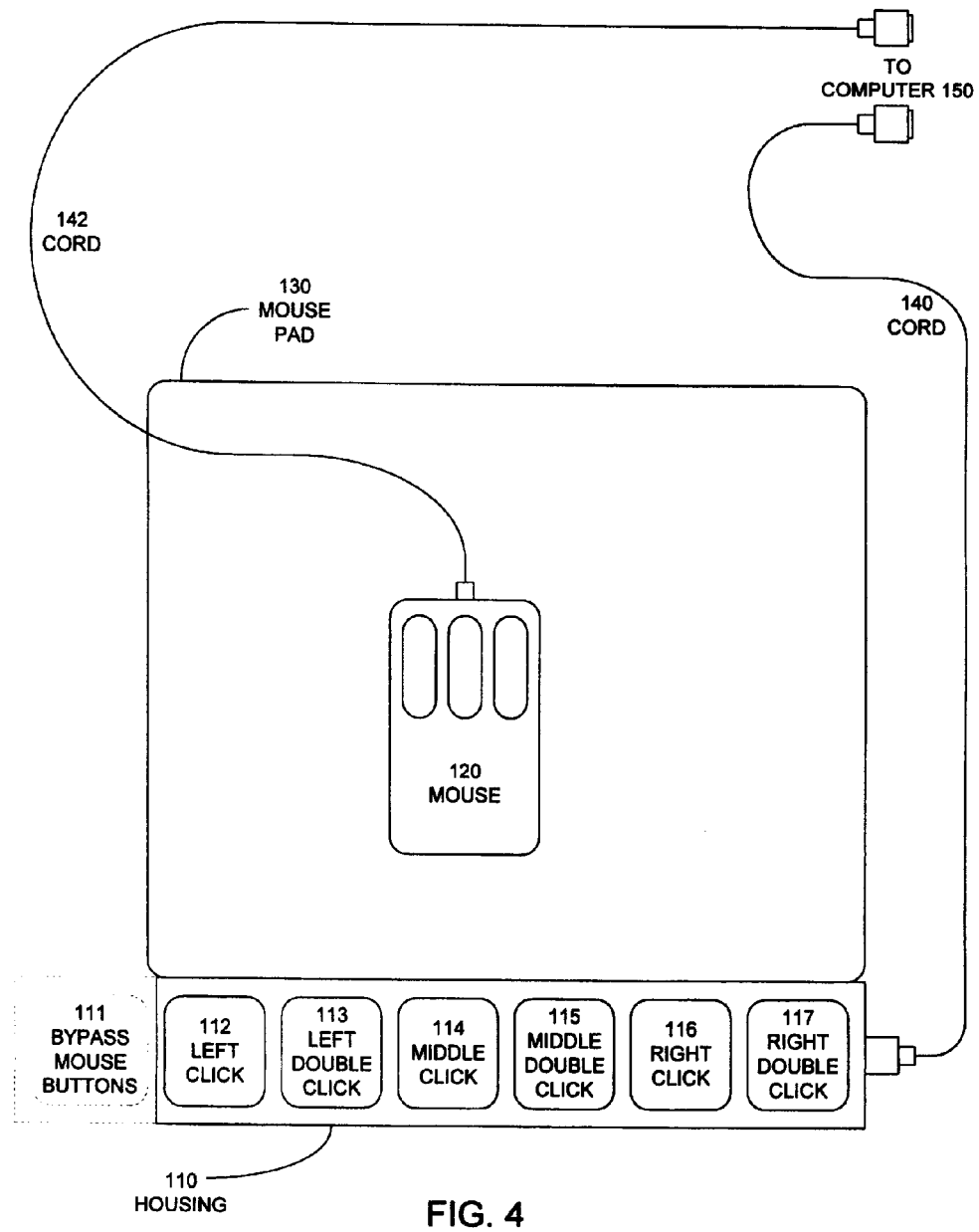

The reticule 7 is provided with a light-passing substrate (a quartz substrate, for example) 7s, which is having a polygonal shape, for example, as illustrated in FIG. 4. On this light-passing substrate 7s, a first through a fourth rectangular circuit pattern area 7a to 7d are positioned adjacently. A rectangular assembly area 7e formed by the assemblage of these circuit pattern areas 7a to 7d is enclosed by a shielding frame 7f, made of chromium. Outside each of two pairs of adjoining sides in the four sides of the assembly area 7e, a first slit pattern (light passing pattern) 7g and a second slit pattern (light passing pattern) 7h are formed parallel to the sides mentioned above, and within the shielding frame 7f. The first slit pattern 7g is about 0.2 mm to 1.0 mm (specifically 0.5 mm, for example) longer than the side of the circuit pattern 7a lying parallel thereto and the second slit pattern 7h is about 0.2 mm to 1.0 mm (specifically 0.5 mm, for example) longer than the side of the circuit pattern 7d lying parallel thereto. The numerical value in this range of 0.2 mm to 1.0 mm may be equal to the width of the scribe line, for example. The scribe line is a line which is severed when the plurality of circuit patterns 7a to 7d are split into chips.

Although not specifically illustrated in the diagram, the patterns for, wiring, capacitor cell plates, or gate electrodes for the MOS transistor, for example, are formed inside the circuit pattern areas 7a to 7d of the reticule 7 using a chromium film, i.e. the same material as the shielding frame 7f.

The size of the area of the reticule 7 is 150 mm×150 mm, for example, the size of the area of the circuit pattern areas 7a to 7d is about 120 mm×120 mm at most, and the gaps $G_1$ and $G_2$ of the first and the second slit pattern 7a and 7h are 2 mm each. The circuit patterns formed in the circuit pattern areas 7a to 7d are projected onto the resist R on the semiconductor wafer W, and reduced to ⅕ of their original size. The reticule 7 constructed as described above is interposed between the upper lens system 5 and the reduction projection part 6 of the exposure device and the circuit pattern areas 7a to 7d of the reticule 7 are repeatedly projected onto the resist R on the semiconductor wafer W as illustrated in FIG. 5A.

The rectangular parts enclosed within the solid lines illustrated in FIG. 5A do not overlap the circumference of the semiconductor wafer W. These are the areas onto which all the circuit pattern areas 7a to 7d shown in FIG. 4 are simultaneously projected.

For the sake of the exposure to these areas, as shown in FIG. 6A, the shape and the position of the opening part 3e of the blind 3 are set such that the light passing the blind 3 is allowed to pass exclusively through all the circuit pattern areas 7a to 7d of the reticule 7. As a result, the latent image of the pattern described on the resist R by one projection of light forms a plan view as is illustrated in FIG. 6B, with the result that the latent images of the plurality of circuit patterns 10 will be formed simultaneously in an adjoining manner. The plurality of circuit patterns 10 shown in FIG. 6B are repeatedly projected onto the resist R by the motion of the wafer stage 2 in either or both of the X and Y directions.

In contrast, the circuit patterns in the area to which not all of the circuit patterns on the reticule 7 is transferred, namely the hatched area shown in FIG. 5A, are projected as follows.

First, when the circuit pattern areas 7a, 7b, and 7d, i.e. some of the circuit pattern areas on the reticule 7, would overlap with the circumference of the semiconductor wafer W during the course of exposure, the opening part 3e or the blind 3 is reshaped by adjusting the positions of the shielding plates 3a to 3d of the blind 3 as illustrated in FIG. 7A. The position, size, and shape of the opening formed are such that the light is only projected onto the circuit pattern area 7c, which does not overlap the edge of the semiconductor wafer W, and peripheral area thereof. In this case, the opening part 3e essentially blocks the passing of light through the other circuit pattern areas 7a, 7b, and 7d.

Therefore, only available circuit patterns, with no missing part, are exposed on the resist R.

Consequently, the latent images of circuit patterns 11 which are formed on the resist R assume a profile as shown in FIG. 7B. Along the sides of the circuit pattern area 7c which are not defined by the shielding frame 7f, the edges of the circuit pattern areas 7a, 7b, and 7d are projected in part, as severed by the blind 3. The circuit patterns which are consequently exposed only partially to light are referred to as rejectable circuit patterns 12.

On the resist R which has been exposed to the part severed by the blind 3, a blur of the focal point occurs in the part to which the edge of the blind 3 is projected. In other words, when the circuit patterns 7a, 7b, and 7d, i.e. the ineffective circuit patterns on the reticule 7, are shielded by the blind 3, the relevant edge part of the blind 3 is projected onto the resist R. Since the edge part of the blind 3 is not focussed on the resist R, it produces a blur of the focal point and forms a cause for the occurrence of abnormal patterns and consequently for the occurrence of the particles which were described in the paragraphs introducing the prior art. Therefore, the part of the resist with the blurred focal point is removed by projecting light through the first and the second slit patterns, 7g and 7h, onto the area in which the edge part of the blind 3 appears. The edge of the blind 3 under discussion will occasionally be referred to hereinafter as "blind edge."

The following additional exposure or double exposure is carried out to remove the rejectable circuit pattern 12 from the area surrounding the normally exposed circuit pattern 11.

By moving each the shielding plates 3a to 3d of the blind 3, the opening part 3e of the blind 3 is formed in a position, size, and shape such that the light is projected only through the second slit pattern 7h on the reticule 7, as shown in FIG. 8A. The positional correspondence between the opening part 3e and the rejectable circuit pattern 12 is attained by moving the wafer stage 2.

Then, in the exposure device, the light which has passed through the second slit pattern 7h is projected onto the part of rejectable circuit pattern 12 which adjoins the available circuit pattern 11 in the X direction. Consequently, the latent pattern image as shown in FIG. 7B is formed by completely erasing the X direction part of the rejectable circuit pattern 12 shown in FIG. 8B, to which the blind edge is transferred.

As a result, the edge of the available circuit pattern 11 on the X direction side is sharpened as illustrated in FIG. 8B and, at the same time, the edge of the blind existing on the X direction side is erased and a latent image 13 of a fine light exposure pattern is formed.

Subsequently, by moving the shielding plates 3a to 3d of the blind 3 to the position illustrated in FIG. 9A, the opening part 3e of the blind 3 is formed in a position, size, and shape such that the light is projected only through the first slit pattern 7g on the reticule 7. The positional correspondence between the opening part 3e and the rejectable circuit pattern 12 is attained by moving the wafer stage 2.

Then, the light which passes through the first slit pattern 7g is projected onto the part adjoining the available circuit pattern in the Y direction, to which the edge of the blind 3 is transferred. Consequently, a latent pattern image as illustrated in FIG. 9B is formed by completely erasing the blind edge which exists on the Y direction side of the available circuit pattern 11. As a result, the edge of the available circuit pattern 11 on the Y direction side is sharpened and, at the same time, the transferred part of the edge of the blind 3 in the Y direction is erased and a latent image 14 of a fine light exposure pattern is formed.

Since the first and second slit patterns 7g and 7h, are both given a slightly greater length than the parallel sides of the circuit patterns 7a to 7d on the reticule 7, the edge parts of the first and the second slit pattern 7g and 7h inevitably overlap each other when these slit patterns 7g and 7h are projected onto the resist R.

The exposure treatment described above is based on the fact that an abnormal pattern due to a blur of the focal point occurs in the part to which the edge of the blind 3 is projected when some of the plurality of circuit patterns 7a to 7d on the reticule 7 are covered by the blind 3. This fact is not disclosed in JP-A-07-142,309.

The latent circuit pattern images as are shown defined by solid lines and broken lines in FIG. 5A, are formed after completion of the step of repeatedly exposing the circuit pattern onto the resist using the reticule and the step of erasing the transferred part of the blind edge by the exposure to light. Consequently, circuit patterns which would overlap with the edge of the semiconductor wafer W are not exposed to light. Therefore, when the resist R is subjected to puddle development after the exposure described above, the resist R remains attached in the area lying along the edge of the semiconductor wafer W and, at the same time, the edges of the available circuit patterns formed near the edge thereof appear in a shape unblurred shape.

After the development process such as is described above, is completed, a plurality of semiconductor integrated circuits are formed by a step of patterning a film 20 beneath a pattern $R_0$, of the resist R, and by other steps which follow as shown in FIG. 5B.

Next, other examples of the reticule will be describer below.

The number of circuit patterns to be formed in the reticule is not limited to four as illustrated in FIG. 4. The double exposure (peripheral exposure) by the slit pattern described above can be utilized wherever the number of circuit patterns is two or more, as illustrated in FIG. 10A to FIG. 14.

First, when the reticule to be used has a plurality of circuit pattern areas 21 arrayed in series in just one direction, as illustrated in FIG. 10A and FIG. 10B, it suffices to provide within the shielding frame 22, at least one slit pattern 23 parallel to the boundary of the adjoining circuit pattern areas 21. This is because the edge of the blind 3 is projected near the boundary of the adjoining circuit pattern areas 21.

When the reticule to be adopted is so constructed as to partition two circuit pattern areas 24 with a partition band 25 as illustrated in FIG. 11, a U-shaped auxiliary exposure pattern 26 may be provided instead of the slit pattern. In this case, all the edges of the four sides of the available circuit pattern area 24 are sharpened because the partition band 25 and the shielding frame 27 are transferred with a just focus.

The rejectable circuit pattern which is partially exposed, therefore, has the blind edge thereof enclosed within the transferred part of the partition band 25 and the U-shaped auxiliary pattern 26, as indicated by a broken line in FIG. 11. Light is therefore projected onto this enclosed area.

Incidentally, when a plurality of circuit patterns are positioned repeatedly in just one direction on the reticule, the light passing parts of the slit patterns and the U-shaped auxiliary patterns read only be of the same length as the bordering sides of the circuit patterns. The blind edge can be erased by projecting the light through these light passing parts.

When the reticule to be adopted has a plurality of circuit patterns 30 formed in both the X and the Y direction as shown in FIG. 12 to FIG. 14, it becomes necessary to form within the shielding frame 33, at least two slit patterns, 31 and 32, which are respectively parallel to the X direction and the Y direction. These slit patterns 31 and 32 are preferably positioned close to the center of the assembly area 34 for assembling the circuit patterns 30. This is because, the available exposure area on the stepper 2, the exposure device shown in FIG. 2, has a circular shape, for example, of about 22 mm in diameter. By positioning the slit patterns 31 and 32 to the center and with a narrow gap as shown in FIG. 13, therefore, the circuit patterns 30 can be position with the largest possible size in the available exposure area 35.

The preferred embodiment, as depicted above, has the slits and U-shaped auxiliary patterns for projecting the light onto the part of the resist to which the blind edge is transferred on the same reticle as the circuit patterns. However, they may be formed on different reticles. Also, in the method described above, the erasure of the blind edge was done after the exposure of the circuit pattern, but the order of these operations may be reversed.

Furthermore, it is preferable that both the slit patterns and the circuit patterns are only projected in positions where they do not protrude from the semiconductor wafer.

It is possible that a length of the light passing pattern has a length equal to the sum of the length of one side of each of the circuit patterns.

In this invention, as described above, after a plurality of circuit patterns in a reticle are projected onto a resist on a semiconductor wafer, with the exposure of the circuit patterns which overlap with the edge of the wafer being blocked by a blind, a separate mask is used to selectively expose the parts on the wafer to which the edge of the blind was projected, and to remove these parts.

As a result, the exposure of the ineffective circuit patterns which overlap with the edge of the wafer is prevented, the formation of abnormal resist patterns which occurs around the circumference of a semiconductor wafer is avoided, and the occurrence of abnormal resist patterns which occur as a result of the blurred focus where the edge of the blinds are projected is also prevented. It is therefore possible to greatly suppress the occurrence of particles, which arise from these abnormal resist patterns.

Further, since only those of the plurality of circuit patterns formed in the reticule which do not overlap with the edge of the semiconductor wafer are exposed to light, the number of available circuit patterns that are formed on the semiconductor wafer does not need to be reduced, making it possible to increase the yield.

There is no reduction in throughput because the reticule to be used has a plurality of circuit patterns formed therein.

The necessity for changing reticules is obviated and the decline of the throughput due to re-positioning is avoided because the circuit patterns and the patterns to be used for the erasure of the blind edge are formed on one and the same reticule.

What is claimed is:

1. A method for producing semiconductor devices comprising the steps of:

placing a first exposure mask in opposition to a resist film on a semiconductor wafer wherein a plurality of circuit patterns are formed repeatedly on a substrate of said exposure mask;

shielding one or more of said circuit patterns with a blind mask, where said one or more said circuit patterns face an edge of said semiconductor wafer while remaining circuit patterns do not overlap said edge;

exposing said resist film through the said remaining circuit patterns of said first exposure mask which are not shielded with said blind mask to form exposed remaining circuit patterns and partially exposed resist film portions outside an edge of said exposed remaining circuit patterns;

exposing the partially exposed resist film portions by irradiating a light through at least one of a plurality of light passing patterns on a second exposure mask; and developing said resist film.

2. A method for producing semiconductor devices according to claim 1, wherein said first exposure mask and said second exposure mask are formed together on a substrate.

3. A method for producing semiconductor devices according to claim 2, wherein said circuit patterns of said first exposure mask are arranged in one direction.

4. A method for producing semiconductor devices according to claim 3, wherein said second exposure mask is adjacent to said first exposure mask in said one direction on said substrate.

5. A method for producing semiconductor devices according to claim 4, wherein at least one of said light passing patterns of said second exposure mask is positioned parallel to said circuit patterns of said first exposure mask.

6. A method for producing semiconductor devices according to claim 2, wherein said circuit patterns of first exposure mask are positioned adjacently in first and second directions perpendicular to each other, in a first area, and said light passing patterns of said second exposure mask are formed alongside said first area, in said first or second directions.

7. A method for producing semiconductor devices according to claim 6, wherein said light passing pattern of said second exposure mask is selected from among a plurality of light passing patterns formed around said first area.

8. A method for producing semiconductor devices according to claim 6, wherein said first area is a polygon shape, with said polygon shape having a first side extending to said first direction, and said first light passing pattern is formed along said first side.

9. A method for producing semiconductor devices according to claim 8, wherein said light passing pattern is formed in the center of said first side.

10. A method for producing semiconductor devices according to claim 6, wherein said first area is a polygon shape, with said polygon shape having first and second sides along said first and second directions respectively, and said plurality of light passing patterns is formed in the center of said first or second side.

11. A method for producing semiconductor devices according to claim 1, wherein at least one of said light passing pattern of said second exposure mask has a length parallel to a first direction, and said length is longer than one side of each of the said circuit patterns parallel to said first direction.

12. A method for producing of semiconductor devices according to claim 1, wherein at least one of said light passing pattern of said second exposure mask has a length equal to one of the lengths of one side of each of said circuit patterns.

13. A method for producing of semiconductor devices according to claim 1, where each of said circuit patterns form a part of a dynamic random access memory cell.

* * * * *

UNITED STATES PATENT AND TRADEMARK OFFICE
CERTIFICATE OF CORRECTION

PATENT NO. : 6,195,084 B1  
DATED : February 27, 2001  
INVENTOR(S) : Stephen C. Murphy Page 1 of 11

It is certified that error appears in the above-identified patent and that said Letters Patent is hereby corrected as shown below:

See Abstract.

See Specification.

See Claims.

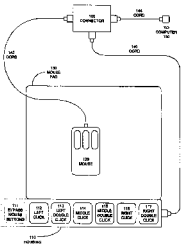

Signed and Sealed this

Thirteenth Day of August, 2002

Attest:

Attesting Officer

JAMES E. ROGAN  
Director of the United States Patent and Trademark Office

(12) United States Patent
Murphy

(10) Patent No.: US 6,195,084 B1
(45) Date of Patent: *Feb. 27, 2001

(54) MOUSE BUTTONS DESIGNED FOR IMPROVED AVAILABILITY

(75) Inventor: Stephen C. Murphy, Payette, ID (US)

(73) Assignee: Micron Electronics, Inc., Nampa, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,524

(22) Filed: Oct. 14, 1997

(51) Int. Cl.[7] ............................................... G09G 5/08
(52) U.S. Cl. ..................... 345/163; 345/156; 345/157; 345/161; 345/167
(58) Field of Search .................. 345/163, 156, 345/157, 161, 167, 173

(56) References Cited

U.S. PATENT DOCUMENTS

| | | | |
|---|---|---|---|
| 4,964,075 A | * 10/1990 | Shaver et al. | 710/67 |
| 5,305,449 A | * 4/1994 | Ulenas | 710/73 |
| 5,611,040 A | * 3/1997 | Brewer et al. | 395/326 |
| 5,793,972 A | * 8/1998 | Shane | 395/200.49 |
| 5,870,080 A | * 2/1999 | Burnet et al. | 345/163 |
| 5,898,424 A | * 4/1999 | Flannery | 345/163 |

* cited by examiner

*Primary Examiner*—William A. Cuchlinski, Jr.
*Assistant Examiner*—Marthe Y. Marc-Coleman
(74) *Attorney, Agent, or Firm*—Park & Vaughan LLP

(57) ABSTRACT

One embodiment of the present invention provides an apparatus for inputting selection commands into a computer system, to be used in conjunction with a pointing device, such as a mouse. The apparatus includes an input port, for receiving input signals from the pointing device, and an output port, for passing output signals to the computer system. The apparatus also provides a channel for coupling input signals from the pointing device to output signals going to the computer system. Through this channel, positioning information from the pointing device can be passed through to the computer system. The apparatus additionally provides a plurality of switches coupled to the output port for sending selection signals, such as mouse click signals, to the computer systems. In this embodiment, the apparatus is coupled between the pointing device and the computer system, and requires no modification to the pointing device or the computer system. In a variation on this embodiment, the apparatus includes signal generation circuitry coupled between the switches and the output port, for generating an electrical signal, such as a double click, in response to an activation of a switch. In another embodiment, this signal generation circuitry is programmable. In a variation on this embodiment, the signal generation circuitry is programmable through a learning mode, in which sequences of inputs into the pointing device are recorded for future playback in response to activation of a switch.

13 Claims, 4 Drawing Sheets

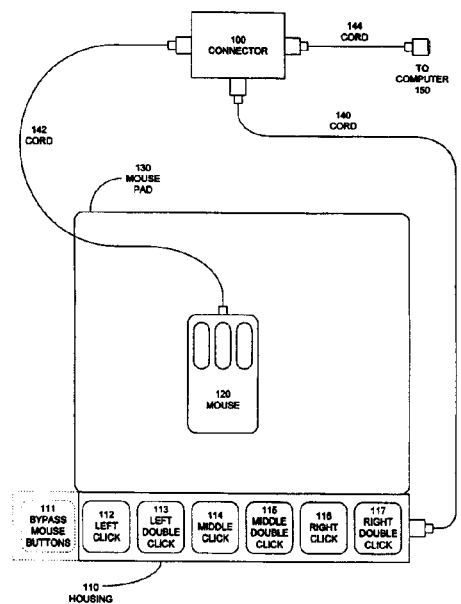

MOUSE BUTTONS DESIGNED FOR IMPROVED AVAILABILITY

BACKGROUND

1. Field of the Invention

The present invention relates to pointing devices, such as a mouse, for computers with graphical user interfaces, and more particularly to buttons to be used in concert with such pointing devices, which are designed for easier use by people working in rugged environments, where gloves must be worn, or by physically impaired people.

2. Related Art

As computer users increasingly navigate through window-based user interfaces, data input devices, such as a mouse, have become standard features on modern computer systems. These data input devices are typically used to move a cursor around a graphical display, and they typically include associated buttons, such as mouse buttons, which are used select and activate graphical objects located under or near the cursor.

The term "pointing device" is used in this specification to refer to any manually operated input device that can be used to move a cursor around a computer display, this includes but is not limited to: a mouse, a track ball, a pointing stick (joy stick), a glide point and a touch screen.

A mouse typically includes a movable housing that can be moved around a surface, such as a mouse pad, to control the position of a cursor on a graphical display. A mouse typically includes a plurality of buttons disposed on the housing for selecting items on the graphical display that are associated with the position of the cursor.

A pointing stick (or joy stick) typically takes the form of a short stick, protruding perpendicularly from a housing. If force is applied to the pointing stick in a direction parallel to the surface of the housing, the pointing stick will pivot so as to specify a direction relative to the surface of the portable computer. This direction is typically used to move a cursor around the portable computer screen. The pointing stick is typically biased so that it returns to a position perpendicular to the surface of the housing when released. A joy stick is a variation of a pointing stick.

A glide point is another type of pointing device that typically takes the form of a plate that is sensitive to the touch of a finger. A glide point can detect the finger through a variety of means, including capacitive sensors, resistance sensors and pressure sensors. A glide point is typically designed so that when a finger touches the glide point, associated circuitry determines a location on the plate where the finger touches the glide point surface. By "gliding" a finger along the glide point surface, a user can specify a velocity and a direction of travel for a cursor on a graphical display.

A track ball is another type of pointing device that typically takes the form of a ball disposed within a recess so that the ball is able to freely rotate about its center. By rotating the ball in a particular direction, the user can specify a displacement of the cursor on the graphical display.

A touch screen can also be used as a pointing device. A touch screen typically takes the form of a computer display that is sensitive to the touch of a human finger or hand. If the proper software is implemented, a computer user can move a cursor around the computer display by touching the surface of the display.

A computer user working a rugged environment, such as in extreme cold, in space, underwater, in a radiation suit or even in a car repair shop, may encounter significant difficulties using pointing devices, such as a mouse. These computer users will often be wearing gloves, which can make it challenging to operate a pointing device. Physically impaired computer users may also encounter similar difficulties. Even if a computer user is able to move a cursor around a graphical display using a pointing device, a great amount of manual dexterity is required to operate associated buttons, such as mouse buttons, by clicking and especially double-clicking the associated buttons. Computer users operating in rugged environments, or physically impaired computer users, are likely to inadvertently click a mouse button while moving a mouse around a mouse pad, or they are likely to have a hard time performing a double-clicking operation.

What is needed is an apparatus that allows computer users to more easily operate buttons, such as mouse buttons, associated with a pointing device, such as a mouse.

SUMMARY

One embodiment of the present invention provides an apparatus for inputting selection commands into a computer system, to be used in conjunction with a pointing device, such as a mouse. The apparatus includes an input port, for receiving input signals from the pointing device, and an output port, for passing output signals to the computer system. The apparatus also provides a channel for coupling input signals from the pointing device to output signals going to the computer system. Through this channel, positioning information from the pointing device can be passed through to the computer system. The apparatus additionally provides a plurality of switches coupled to the output port for sending selection signals, such as mouse click signals, to the computer systems. In this embodiment, the apparatus is coupled between the pointing device and the computer system, and requires no modification to the pointing device or the computer system. In a variation on this embodiment, the apparatus includes signal generation circuitry coupled between the switches and the output port, for generating an electrical signal, such as a double click, in response to an activation of a switch. In another embodiment, this signal generation circuitry is programmable. In a variation on this embodiment, the signal generation circuitry is programmable through a learning mode, in which sequences of inputs into the pointing device are recorded for future playback in response to activation of a switch. Another embodiment includes a bypass switch to selectively enable or disable selection buttons from the pointing device, such as mouse buttons, thereby allowing selection buttons from the pointing device to be used at the same time the switches are being used.

In another embodiment of the present invention, the switches are disposed on a movable housing, which can be selectively placed at a range of locations to be operated in concert with the pointing device. In a variation on this embodiment, the housing includes a fastener that allows the housing to be fixedly secured at a particular location.

In other embodiments, the pointing device can assume a number of forms, including, a mouse, a pointing stick, track ball, a glide point or a touch screen.

In another embodiment, the switches include buttons requiring a significant amount of force to operate so that a user does not inadvertently activate a switch. In variations on this embodiment, the force required to activate a switch is greater, one ounce, four ounces, and 16 ounces.

Another embodiment of the present invention provides an apparatus for inputting commands into a computer system, to be used in conjunction with a pointing device. This embodiment includes a housing and an output channel coupled to the housing to transfer output signals to the computer system. This embodiment also includes electrical switches disposed on the housing and coupled with the output channel, for generating output signals to be transferred to the computer system, including a signal corresponding to a double click of a mouse button.

DESCRIPTION OF THE FIGURES

Figure 1:
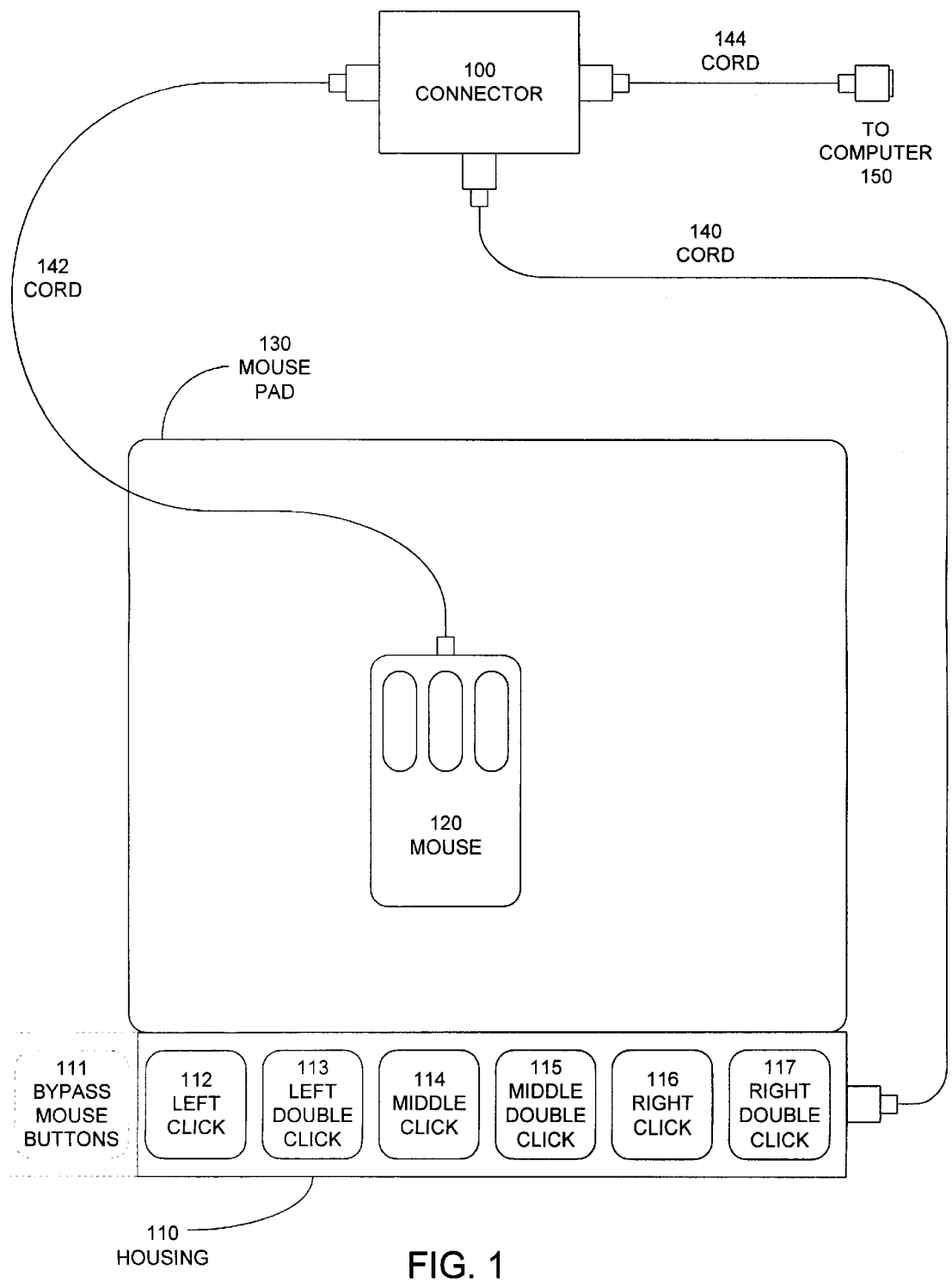
FIG. 1A depicts the results of the exposure to light by the conventional method of light exposure and FIG. 1B is a plan view schematically illustrating a reticule in popular use.

FIG. 1 illustrates an embodiment of the present invention including a housing 110 with a plurality of selection buttons disposed thereon, to be operated in concert with mouse 120.

FIG. 2 is a schematic diagram illustrating the internal structure of connector 100 and housing 110 in accordance with an embodiment of the present invention.

FIG. 3 is a flowchart illustrating some of the operations performed by microcontroller 110 in accordance with an embodiment of the present invention.

FIG. 4 illustrates an embodiment of the present invention in which housing 110 is separately coupled with computer 150 through cord 140.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Description of First Embodiment

FIG. 1 illustrates an embodiment of the present invention including a housing 110 with a plurality of selection buttons disposed thereon, to be operated in concert with mouse 120.

Mouse 120 is coupled to connector 100 through cord 142. In this embodiment, mouse 120 includes a plurality of buttons, including a left button, a middle button and a right button. A user moves mouse 120 across mouse pad 130 in order to send signals to computer 150 that cause a cursor to navigate around a graphical display in computer 150. The embodiment illustrated in FIG. 1 provides a mouse as a pointing device. However, in general, the present invention can be operated with any pointing device that can be used to move a cursor around a display. These pointing devices include, but are not limited to, a mouse, a pointing stick, a glide point, a track ball, or a glide point.

Connector 100 is coupled to mouse 120 through cord 142, and is coupled to housing 110 through cord 140. Connector 100 is additionally coupled to computer 150 through cord 144. Connector 100 takes inputs from mouse 120 and switches in housing 110, and produces outputs, which are sent to computer 150. Connector 100 includes circuitry to selectively manipulate and route signals from mouse 120 and housing 110 to computer 100. In this embodiment, some signals from mouse 120 and housing 110 pass directly through connector 100 and cord 144 to the computer 150. Other signals may pass through connector 100 in modified form. Yet other signals may be generated within connector 100 and routed to computer 150. Other signals may stop at connector 100, and not be passed to computer 150.

In the illustrated embodiment, housing 110 includes a plurality of switches in the form of buttons, including: left click button 112, left double click button 113, middle click button 114, middle double click button 115, right click button 116 and right double click button 117. These buttons are used to generate signals to be passed to computer 150 through connector 100. In the illustrated embodiment, left click button 112 is used to generate a signal corresponding to a click on the left button of mouse 120. Left double click button 113 is used to generate a signal corresponding to a double click on the left button of mouse 120. Middle click button 114 is used to generate a signal corresponding to a click on the middle button of mouse 120. Middle double click button 115 is used to generate a signal corresponding to a double click on the middle button of mouse 120. Right click button 116 is used to generate a signal corresponding to a click on the right button of mouse 120. Right double click button 117 is used to generate a signal corresponding to a double click on the right button of mouse 120.

In embodiment illustrated in FIG. 1 the switches take the form of buttons. However, in general any switching device can be used. Switching devices that may be used include, but are not limited to: toggle switches, sliding switches, touch-sensitive switches, optical switching devices and any other switching device capable of being operated by a person wearing a glove or a physically impaired individual. Note that the switches in the illustrated embodiment are large and clearly marked, allowing for easy operation.

In a variation on the illustrated embodiment, the buttons require a significant amount of pressure or a significant amount of travel to be activated. This makes it unlikely that a user will inadvertently activate a button by brushing against it. Different embodiments require different amounts of pressure to activate the switches. These required pressures include pressures greater than: a quarter of an ounce, a half of an ounce, one ounce, two ounces, four ounces, eight ounces, one pound, two pounds, four pounds, eight pounds and sixteen pounds. The larger pressures are better suited to foot-activated switches or other non-manually activated switches.

In another embodiment, some of the switches include buttons which when depressed remain activated until depressed again. This users to perform operations such as mouse drags by: depressing a switch to select an object; moving the object with the mouse; and depressing the switch again to release the object.

In the illustrated embodiment, housing 100 is in the form of a strip that can be attached at a range of locations in the vicinity of the associated pointing device. In a variation on this embodiment, housing 110 includes a fastener that allows housing 110 to be fixedly secured at a number of locations. The fastener can take the form of any commonly known fastener capable of securing housing 110. This includes, but is not limited to, suction cups, VELCRO™, sticky pads, a tying cord, and a mounting bracket. In another embodiment, housing 110 is fixedly secured to an edge of mouse pad 130.

In another embodiment, housing 110 includes a switch to bypass mouse buttons 111. This switch allows the user to select the mouse buttons on mouse 120 to be active while the buttons on housing 110 are active. Alternatively, the user can select the switch on mouse 120 to be inactive while the buttons on housing 110 are active, so that a user operating the mouse does not inadvertently activate one of the buttons on the mouse. This bypassing mechanism may be implemented in hardware or software. In one embodiment, the bypassing is accomplished purely through software, and no bypass switch, such as switch 111, is included in housing 110. In another embodiment, signals from housing 110 are different than signals from mouse 120, allowing the signals from mouse 120 to be differentiated from signals from housing 110, even when signals from mouse 120 are mixed with the signals from housing 110.

The embodiment illustrated in FIG. 1 includes a housing 120 and separate connector 100 coupled together by cord 140. In another embodiment, connector 110 and housing 110 are integrated into the same housing.

The embodiment illustrated in FIG. 1 operates as follows. Connector 110 and cord 144 are interposed between mouse 120 and computer 150. A system user moves a cursor about a graphical display by moving mouse 120. In this embodiment, the buttons on mouse 120 are inactive so that they are not inadvertently depressed. In order to send selection signals to the computer system, the user depresses the buttons on housing 110. For example, depressing left double click button once causes a signal that appears to be a double click signal from a left mouse button to be passed to computer system 150.

In the illustrated embodiment, no modification is required to the hardware or software in computer system 150 because the signals passed to computer 150 appear to be the same as the signals generated by mouse 120. However, another embodiment requires a customized mouse driver is installed in computer 150.

Description of Circuitry

FIG. 2 is a schematic diagram illustrating the internal structure of connector 100 and housing 110 in accordance with an embodiment of the present invention. Connector 100 receives wires from mouse 120 through cord 142 and from housing 110 through cord 140. It outputs signals to computer 150 through cord 144. Some of the signals from mouse 120 pass straight through connector 100 to computer 150. In one embodiment, these signals include positioning signals from mouse 120, for controlling the position of a cursor on a graphical display in computer 150. Other signals from mouse 120, such as mouse click signals, are coupled to microcontroller 200. Microcontroller 200 also receives signals from switches on housing 110.

Microcontroller 200 can be any type of circuit that can operate on signals from mouse 120 and housing 110 to produce signals for computer 150. In one embodiment, microcontroller 200 includes a single chip processor including a processor and a memory. In another embodiment, microcontroller 200 is replaced by hard-wired circuitry that performs the same functions of converting signals from mouse 120 and housing 110 into signals for computer 150. In the illustrated embodiment, microcontroller 200 is shown within connector 100, but it can be easily placed at other locations. In another embodiment, microcontroller 200 is located in housing 110.

Housing 110 includes a plurality of switches. One side of each switch is coupled by a pullup resistor to VCC. The other side of each switch is coupled to ground, so that when a switch is depressed, the voltage on the attached wire goes to ground, which indicates to microcontroller 200 that the switch is activated. Upon detecting a switch activation, microcontroller 200 generates corresponding signals for computer 150.

The circuitry illustrated in FIG. 2 operates as follows. Signals carrying positioning information from mouse 120 pass straight through to computer 150, so that mouse 120 remains operative to control the position of a cursor within a graphical display in computer 150. However, signals from mouse buttons on mouse 120 stop at connector 100. and do not pass through to computer 150. Instead, signals from switches in housing 110 are used to activate microcontroller 200 to generate signals that appear to be signals from the mouse buttons on mouse 120. For example, depressing left double click button 113 causes microcontroller 200 to send a left double click signal to computer 150.

In another embodiment, the signals generated by microcontroller 200 for computer 150 are programmable. This makes it possible to selectively configure switches on housing 110 to produce different signals for computer 150. Programmable switches can be implemented by selectively storing codes corresponding to different signals in different memory locations within microcontroller 200.

In a variation on this embodiment, the signal generation circuitry is programmable through a learning mode, in which sequences of inputs into the pointing device are recorded for playback in response to activation of a switch. In this variation, it is possible to program cursor movements from fixed reference points on the display for future playback when a switch is activated. It is also possible to program sequences of mouse button clicks. The software to implement these learning functions can be programmed into computer system 150 in either a pointing device driver or a stand-alone program. It can alternatively be programmed into microcontroller 200.

Description of Programming for the Microcontroller

FIG. 3 is a flowchart illustrating some of the operations performed by microcontroller 200 in accordance with an embodiment of the present invention. The system starts at state 310, in which input is received from switches in housing 110 through a port in microcontroller 200. The system then proceeds to state 320. In state 320, the system determines if the input from the switches indicates a left click. If so, the system proceeds to state 325, in which a left click signal is sent to computer 150. The system then advances to state 330. If no left click was indicated, the system proceeds to state 330 directly. In state 330, the system determines if the input from the switches indicates a left double click. If so, the system proceeds to state 335, in which a left double click signal is sent to computer 150. The system then advances to state 340. If no left double click was indicated, the system proceeds to state 340 directly. In state 340, the system determines if the input from the switches indicates a middle click. If so, the system proceeds to state 345, in which a middle click signal is sent to computer 150. The system then advances to state 350. If no middle click was indicated, the system proceeds to state 350 directly. In state 350, the system determines if the input from the switches indicates a middle double click. If so, the system proceeds to state 355, in which a middle double click signal is sent to computer 150. The system then advances to state 360. If no middle double click was indicated, the system proceeds to state 360 directly. In state 360, the system determines if the input from the switches indicates a right click. If so, the system proceeds to state 365, in which a right click signal is sent to computer 150. The system then advances to state 370. If no right click was indicated, the system proceeds to state 370 directly. In state 370, the system determines if the input from the switches indicates a right double click. If so, the system proceeds to state 375, in which a right double click signal is sent to computer 150. The system then returns to state 370 to get additional input from the switches on housing 110. If there was no right double click indicated, the system proceeds to state 370 directly.

Description of Second Embodiment

FIG. 4 illustrates an embodiment of the present invention in which housing 110 connects to computer 150 directly. This embodiment is the same as the embodiment illustrated in FIG. 1, except that there is no connector 100. Instead, mouse 120 and housing 110 are directly coupled to computer 150 through cords 142 and 140, respectively. In a variation on this embodiment, software within computer 150 controls the actions of signals from switches on housing 110. In another variation, housing 110 includes the circuitry to generate signals for computer 110.

The foregoing descriptions of embodiments of the invention have been presented for purposes of illustration and description only. They are not intended to be exhaustive or to limit the invention to the forms disclosed. Obviously, many modifications and variations will be apparent to practitioners skilled in the art.

What is claimed is:

1. An apparatus for inputting commands into a computer system, to be used in conjunction with a mouse, comprising:
    an input port, for receiving a plurality of input signals from the mouse, the plurality of input signals including positioning signals carrying positioning information from the mouse, the plurality of input signals also including mouse button signals originating from buttons coupled to the mouse;
    an output port, for passing a plurality of output signals to the computer system;
    a channel coupled with the input port and the output port, for electrically coupling the plurality of input signals from the mouse with the plurality of ouput signals going to the computer system;
    wherein the positioning signals pass through the channel from the input port to the output port without alteration;
    a plurality of switches coupled with the output port, for generating output signals to be passed to the computer system;
    wherein the plurality of switches generate output signals that replace mouse button signals from the mouse; and
    signal generation circuitry coupled between the plurality of switches and the output port, for generating an output signal for the computer system in response to activation of a first switch in the plurality of switches, wherein a single assertion of the first switch causes two assertions of the output signal that correspond to a double-click of a mouse button signal.

2. The apparatus of claim 1, wherein the signal generation circuitry is programmable.

3. The apparatus of claim 2, wherein the signal generation circuitry is programmable through a learning mode, in which sequences of inputs into the mouse are recorded for future playback in response to activation of a switch in the plurality of switches.

4. The apparatus of claim 1, wherein the switches are buttons disposed on a movable housing which can be placed at a range of locations to be operated in concert with the the mouse.

5. The apparatus of claim 4, wherein the movable housing includes a fastener that allows the movable housing to be fixedly secured at a number of locations.

6. The apparatus of claim 1, wherein the plurality of switches include buttons which require more than one ounce of force to activate.

7. The apparatus of claim 1, wherein the plurality of switches include buttons which require more than four ounces of force to activate.

8. The apparatus of claim 1, wherein the plurality of switches include buttons which require more than 16 ounces of force to activate.

9. The apparatus of claim 1, wherein the plurality of switches include buttons which when depressed remain activated until depressed again.

10. The apparatus of claim 1, wherein the mouse button signals are selectively passed through the channel to the computer system by activating a switch in the plurality of switches.

11. An apparatus for inputting commands into a computer system, to be used in conjunction with a mouse, comprising:
    an input port adapted to receive a connector from the mouse, for receiving a plurality of input signals from the mouse, the plurality of input signals including positioning signals carrying positioning information from the mouse, the plurality of input signals also including mouse button signals originating from buttons on the mouse;
    an output port, for passing a plurality of output signals to the computer system;
    a channel coupled with the input port and the output port, for electrically coupling the plurality of input signals from the mouse with the plurality of output signals going to the computer system;
    wherein the positioning signals pass through the channel from the input port to the output port without alteration;
    a plurality of switches coupled with the output port, for performing the functions of buttons on the mouse; and
    signal generation circuitry coupled between the plurality of switches and the output port, for generating an output signal for the computer system in response to activation of a first switch in the plurality of switches, wherein a single assertion of the first switch in the plurality of switches causes two assertions of the output signal that correspond to a double-click of a button on the mouse.

12. An apparatus for inputting commands into a computer system, to be used in conjunction with a mouse, comprising:
    a housing;
    an output port coupled to the housing, for coupling to the computer system to transfer output signals to the computer system; and
    a plurality of switches disposed on the housing and coupled with the output port, for generating output signals to be transferred to the computer system;
    wherein the plurality of switches generate output signals that replace mouse button signals originating from buttons coupled to the mouse; and
    signal generation circuitry coupled between the plurality of switches and the output port, for generating an output signal for the computer system in response to activation of a first switch in the plurality of switches, wherein a single assertion of the first switch causes two assertions of the output signal that correspond to a double-click of a mouse button signal.

13. A method for inputting commands into a computer system from a mouse, comprising:
    receiving a plurality of input signals from the mouse at an input port, the plurality of input signals including positioning signals carrying positioning information from the mouse, the plurality of input signals also including mouse button signals originating from buttons coupled to the mouse;
    electrically coupling the plurality of input signals from the mouse with a plurality of output signals on an output port going to the computer system;

passing the plurality of output signals to the computer system so that the positioning signals pass from the input port to the output port without alteration;

receiving a plurality of switch signals from a plurality of switches;

coupling the plurality of switch signals to the output port so that the plurality of switches generate output signals that replace mouse button signals from the mouse; and generating an output signal for the computer system in response to activation of a first switch signal in the plurality of switch signals, wherein a single assertion of the first switch signal causes two assertions of the output signal that correspond to a double-click of a mouse button signal.

* * * * *